(No Model.) 2 Sheets—Sheet 1.
G. H. SMITH.
METAL CUTTING MACHINE FOR FACING CYLINDERS INTERNALLY.
No. 584,422. Patented June 15, 1897.
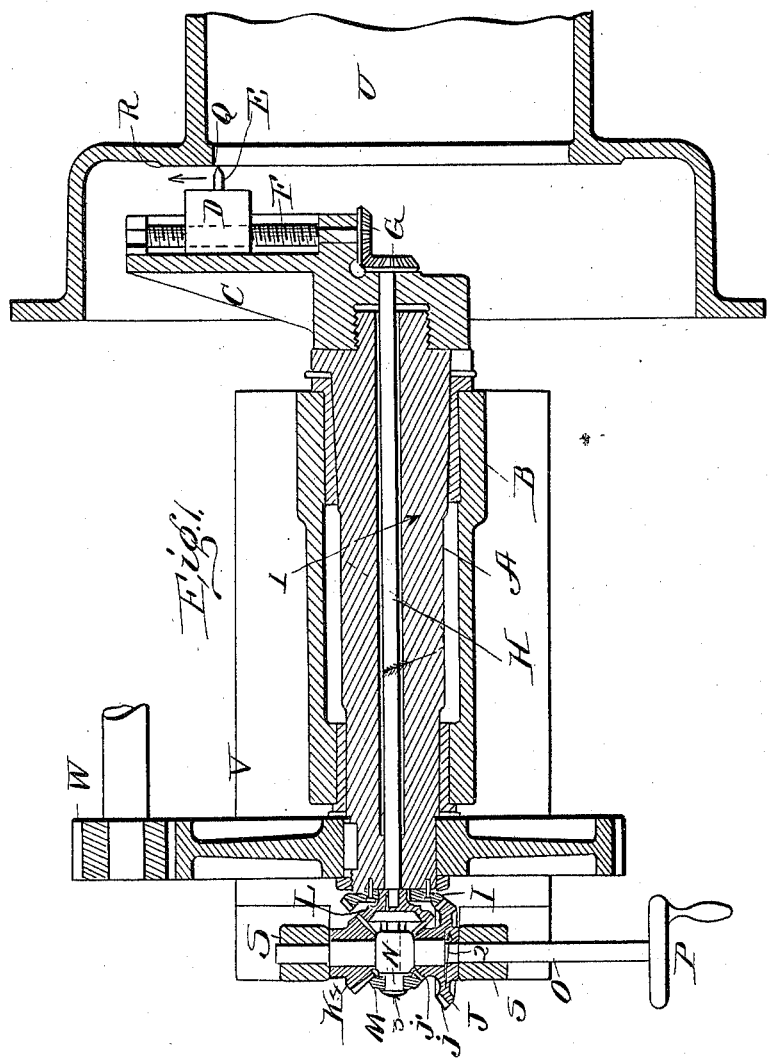
Witnesses:
J. M. Fowler Jr
H. A. Hullfish
Inventor
George Henry Smith
By O. W. Budlong
Attorney (No Model.) 2 Sheets—Sheet 2.
G. H. SMITH.
METAL CUTTING MACHINE FOR FACING CYLINDERS INTERNALLY.
No. 584,422. Patented June 15, 1897.
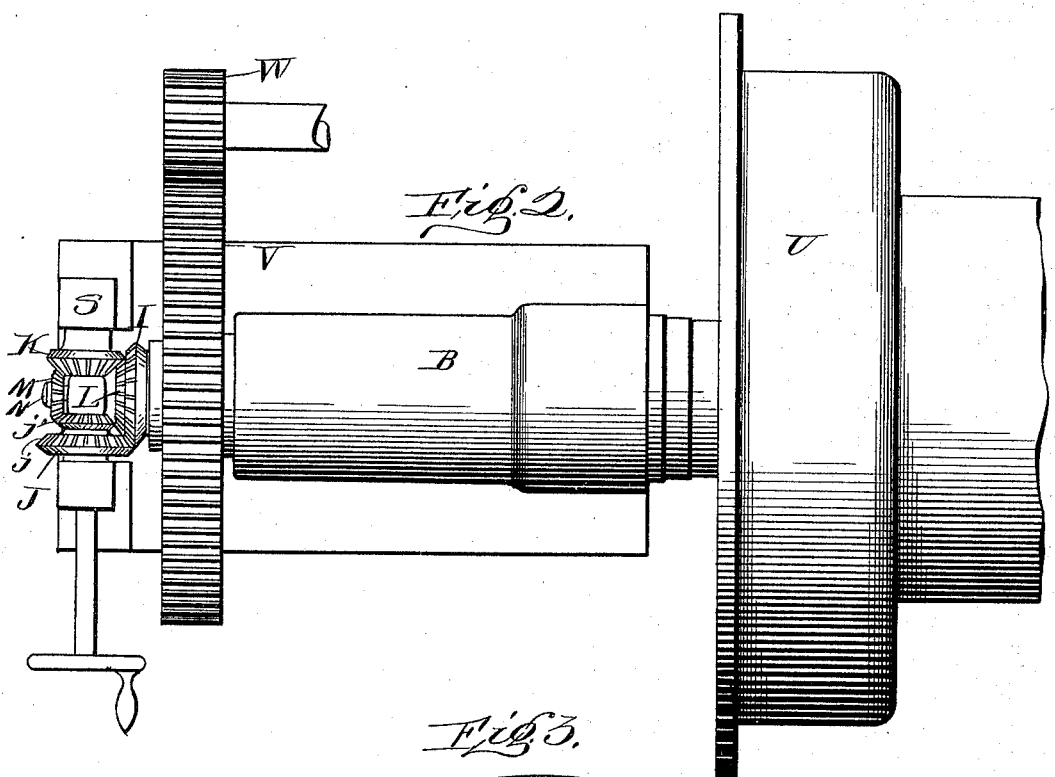
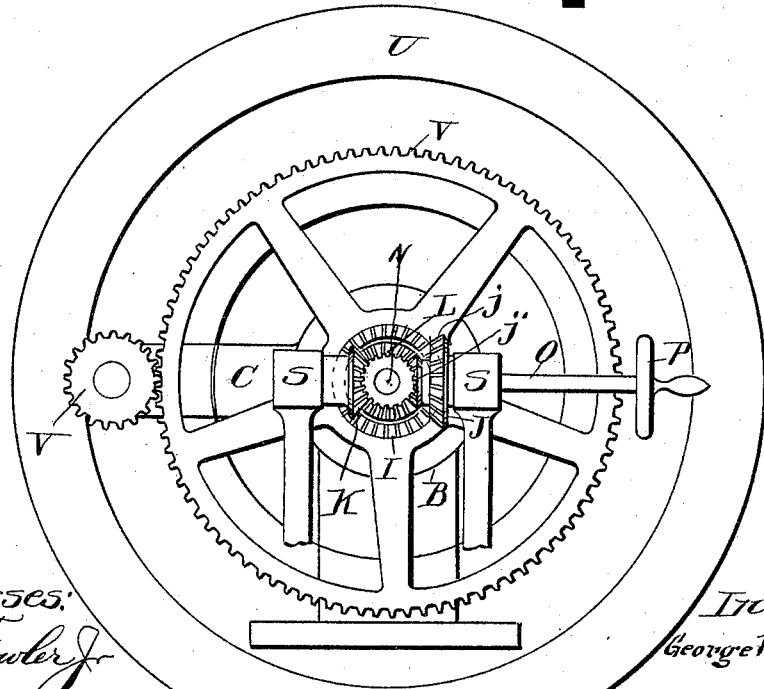
Witnesses:
J. M. Fowler Jr.
H. A. Hallfish
Inventor
George Henry Smith
By O. W. Budlong
Attorney

UNITED STATES PATENT OFFICE.

GEORGE HENRY SMITH, OF PROVIDENCE, RHODE ISLAND, ASSIGNOR TO BEAMAN & SMITH, OF SAME PLACE.

METAL-CUTTING MACHINE FOR FACING CYLINDERS INTERNALLY.

SPECIFICATION forming part of Letters Patent No. 584,422, dated June 15, 1897.

Application filed September 30, 1896. Serial No. 607,407. (No model.)

*To all whom it may concern:*

Be it known that I, GEORGE HENRY SMITH, a citizen of the United States, residing at Providence, in the county of Providence and State of Rhode Island, have invented certain new and useful Improvements in Metal-Cutting Machines for Facing Cylinders Internally; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to that class of metal-cutting machines especially designed for facing cylinders internally, &c., in which the facing-tool revolves with spindle and may be moved to and from the axis of the spindle for a well-known purpose.

The usual means employed to face work with a revolving tool is to have the cutting-tool placed in a slide which in turn is moved radially by means of a screw, said screw usually having a star-wheel secured to its outer end, whereby the tool can be moved in and out in relation to the center of machine-spindle by striking one of the wings of star-wheel during its revolution, the direction of travel of tool depending on the side the star-wheel is operated upon. This means of moving facing-tools can only be used when the outer end of the facer can be reached in its revolution and is not available for internal work or in cramped positions. Again, a star-wheel feed is intermittent and a continuous feed is more desirable. Therefore it has heretofore been proposed to run a shaft through the center of spindle and connect said shaft by gearing to the tool-slide screw. By this means the control of the facing-tool is from the back end of spindle. While the spindle is stationary or not revolving the facing-tool can be moved back and forth by turning the shaft inside of spindle, the travel of facing-tools then being under perfect control of operator; but when the spindle is revolving the conditions are very different. If the internal shaft revolves at the same rate of speed as the spindle, the cutting-tool will remain stationary relatively to center of spindle because the center of revolution of the facer is the axis of the loose shaft carrying the bevel-gear intermeshed with the former gear, but to move the tool in and out from center of revolution one way it must be moved in advance of the spindle and the other is only to be retarded in its revolution. It is therefore quite difficult to arrange the feed in and out at the same ratio per revolution and to maintain perfect control of the travel of the facing-tool in consequence of the difference in velocity of spindle.

The object of my invention, therefore, is to provide a construction whereby the revolution of the spindle does not affect the shaft for advancing the tool toward or from the center of the axis of the spindle by hand, or, in other words, whereby the feed-shaft, unless moved purposely, is at rest when the facing-tool travels in a circle and does not approach or recede from the center of revolution, and a revolution of said feed-shaft to the right or left will advance the tool from the center of spindle or return it toward the latter the same amount in either direction irrespective of the state of the spindle, the direction of travel being the same when the spindle is at rest or revolving at any speed.

To this end the invention consists in certain peculiarities in the construction, arrangement, and combinations of the several parts, substantially as hereinafter described, and particularly pointed out in the subjoined claims.

In the accompanying drawings, which illustrate the preferred embodiment of the invention, Figure 1 is a longitudinal sectional view of the device. Fig. 2 is a plan view. Fig. 3 is an end elevation.

A designates the spindle, rotatably mounted in a suitably-supported head B and carrying at one end the facer C. The other end of the spindle is provided with a gear-wheel V, meshed with a pinion W, driven by any suitable power by which the spindle and facer are rotated.

The facer C comprises a body secured to the end of the spindle and extending at approximately right angles therewith, a feed-screw F, journaled in said body and disposed longitudinally thereof, a carrier D, mounted on said feed-screw and advanced or retracted by rotation of the same in one or the other direction, and the facing-tool E, supported by said carrier.

The essence of this invention resides in the means by which the feed-screw is rotated to advance or retract the tool and whereby the advantageous results above stated are accomplished, the preferred construction of which means will now be described.

H comprises a shaft which extends longitudinally through the spindle A and is geared at one end, as by the bevel-gears G, with the adjacent end of the feed-screw.

O designates the hand or power operated feed-shaft, which is journaled in bearings S and extends approximately at right angles with and across the rear end of said shaft H and spindle A. This feed-shaft is provided with loose gears J and K, of which the former is a double gear, having two sets of teeth $j j'$ of different sizes. The teeth $j$ mesh with a gear I, fixed on the adjacent end of the spindle A, and the teeth $j'$ are intermeshed with the teeth of a planet-gear M, that is loosely journaled on the projecting end of a stud N, extending transversely through the feed-shaft O, whereby said gear M will be carried around with the shaft O and will rotate upon said stud at different times. This gear M also meshes with said gear K, and the latter is intermeshed with a gear L, fixed on the adjacent end of shaft H. The feed-shaft O is provided with a crank P, by which it is rotated by hand, (or is provided with power attachment well known in the art.)

The operation of the invention is as follows: First, assume all parts to be at rest and it is desired to move the tool E from Q to R on the piece U being faced. By turning shaft O to the right the stud N will be revolved with said shaft, and planet-gear M will thereby be carried about the axis of the feed-shaft O, inasmuch as the intermediate gear J is at rest. During the revolution of said planet-wheel about the axis of said feed-shaft it causes the loose gear K to revolve and to transmit motion to the feed-screw and cause the carrier to move outward (provided the feed-screw is cut with right-hand thread) from the center of the spindle through gear I, shaft H, and gears G. The relative arrangement and proportions of the gears are such that the gear K will revolve in the same direction as the feed-shaft, but at double the velocity thereof. The return travel of the carrier is accomplished by a reversal of the direction of movement of the feed-shaft. It will now be assumed that the spindle A, with facer C attached, is revolving in the direction of arrow 1 for the purpose of cutting the surface shown from Q to R on piece U. The revolving of spindle A causes gear I, which is attached to it, to revolve also, and as said gear is meshed with gear J the latter will revolve about shaft O in direction of arrow 2, and thereby revolve the planet-gear M, which will in turn revolve in direction of arrow 3 about its axis on stud N and transmit motion to intermediate gear K, which will revolve in direction of arrow 4 and communicate motion to gear L, causing the latter to revolve in the same direction as the spindle A, and thereby rotate the shaft H and feed-screw F without moving shaft O. As all gears are miters or relatively equal their revolutions will be alike.

It is not necessary that all the gears should be forty-five degrees at the pitch-line, as any other angle would give same results, provided they connected with the others, as shown, and all pitch-line cones unite at a common apex or each reaching to a common point in center of shaft O.

The reverse movements take place if the direction of revolution is changed, and, as seen, this action is independent of the number of revolutions per minute or direction of travel. As the rotative motion of the spindle has no direct effect on travel of tool E and does not cause shaft O to revolve it will be readily seen that the shaft O can be readily rotated by hand or power to communicate motion to screw F, thereby causing carrier D to move in either direction, as desired.

I do not wish to be understood as limiting myself to the precise construction of gearing herein shown and described, as the latter is merely the preferred embodiment of my invention, which contemplates, broadly, any train of gearing between the feed-shaft and the spindle and internal shaft, which is of such character as that rotation of the spindle or internal shaft will not turn the feed-shaft, but turning of the feed-shaft will turn the internal shaft, as above specified.

Having thus described my invention, what I claim is—

1. The combination with the rotatable spindle, and the facer attached to said spindle, and having a feed-screw, a carrier movable thereon and the facing-tool carried by said carrier, of a shaft geared with said feed-screw and extending longitudinally through the spindle, a gear fixed on the end of said shaft, a gear fixed on the spindle, a feed-shaft at the end of said spindle, loose gears thereon respectively meshing with the gears on the ends of the former shaft and spindle, a stud carried by said feed-shaft, and a planet-gear loosely mounted on said stud and meshed with said loose gears, substantially as described.

2. The combination with the rotatable spindle, the facer having a feed-screw, a carrier movable thereon and a facing-tool carried by said carrier, and a shaft geared with said feed-screw, of gearing for rotating said shaft, comprising a gear on the end of the shaft, a gear on the end of the spindle, two loose gears, one of which has a double set of teeth of different sizes, one of said loose gears meshing with the gear on said shaft and the larger set of the other loose gear meshing with the gear on the spindle, and a loosely-mounted gear meshing at once with the smaller set of one loose gear and with the other loose gear, said gears being mitered and so arranged that all pitch-cones unite at a common apex.

3. The combination with the rotatable spindle, the facer attached to one end of said spindle and having a feed-screw, a carrier movable thereon and a facing-tool attached to said carrier, an internal shaft extending through said spindle and geared with said feed-screw, a feed-shaft movable independently of said spindle and internal shaft, a planet-gear movable with said feed-shaft as its axis and also having a loose rotative motion on its bearing, and a train of loose and fixed gears between said planet-gear and the spindle and internal shaft.

In testimony whereof I affix my signature in presence of two witnesses.

GEORGE HENRY SMITH.

Witnesses:
D. A. BUFFINGTON,
JOSEPH H. PEARCE.